United States Patent [19]

Kimura et al.

[11] Patent Number: 4,692,583
[45] Date of Patent: Sep. 8, 1987

[54] SURFACE HEAT TREATING APPARATUS

[75] Inventors: Seiichiro Kimura, Koganei; Hidekazu Aoki, Tachikawa, both of Japan

[73] Assignee: Kabushiki Kaisha Toshiba, Kawasaki, Japan

[21] Appl. No.: 895,735

[22] Filed: Aug. 12, 1986

[30] Foreign Application Priority Data

Aug. 12, 1985 [JP] Japan .................................. 60-177196

[51] Int. Cl.⁴ ................................................ B23K 26/00
[52] U.S. Cl. .......................... 219/121 L; 219/121 LQ; 350/613; 350/614; 350/620; 372/101
[58] Field of Search ..... 219/121 L, 121 LM, 121 LP; 350/612, 613, 614, 620, 174, 628; 372/101, 108

[56] References Cited

U.S. PATENT DOCUMENTS 4,195,913 4/1980 Dourte et al. ..................... 350/613

FOREIGN PATENT DOCUMENTS 0054838 12/1985 Japan ............................ 219/121 LQ

OTHER PUBLICATIONS

"Laser Machining Technology", published in Japan, Aug., 1982 by Japanese Welding Institute.

Primary Examiner—C. L. Albritton
Attorney, Agent, or Firm—Schwartz, Jeffery, Schwaab, Mack, Blumenthal & Evans

[57] ABSTRACT

A surface heat-treating apparatus which focuses laser beam onto a surface of a workpiece for heat-treating the same comprises a composite cylindrical segment mirror and a cylindrical mirror provided in a subsequent stage thereof. The composite mirror is made of two cylindrical segment mirrors joined together with a predetermined angle in a V-shaped manner so that the laser beam reflected by the two component cylindrical segment mirrors of the composite mirror is transmitted to the cylindrical mirror in a manner reversed with respect to the lengthwise and widthwise directions of the composite cylindrical segment mirror and a heat-treating area of a rectangular configuration is thereby provided on the workpiece.

3 Claims, 2 Drawing Figures

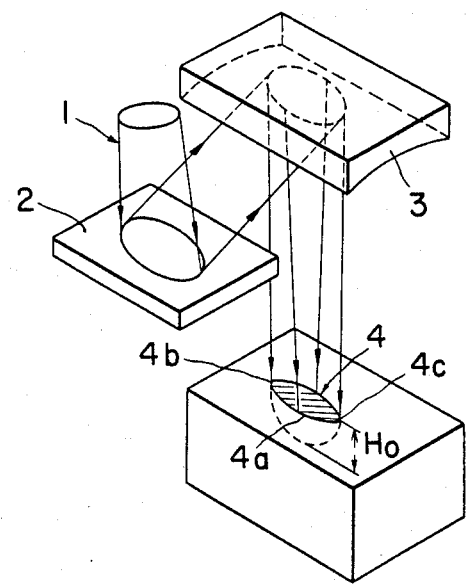
FIG. I PRIOR ART
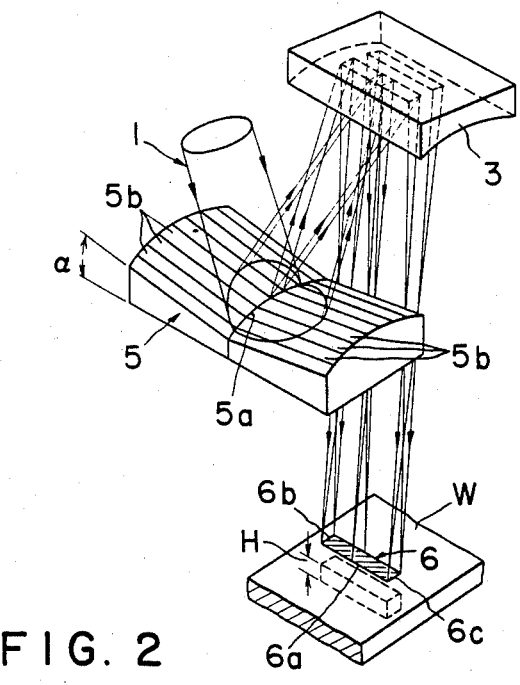
FIG. 2

4,692,583

SURFACE HEAT TREATING APPARATUS

BACKGROUND OF THE INVENTION

This invention relates to a surface heat treating apparatus utilizing laser beam.

When the surface of a workpiece is heat-treated in use of a laser beam transmitted from a laser oscillator, operational characteristics depend much on the configuration of the focused laser beam.

FIG. 1 illustrates a conventional surface heat-treating apparatus utilizing laser beam. In this apparatus, a laser beam 1 emitted from a laser beam oscillator, not shown, is converged by means of a plane mirror 2 and a concave cylindrical mirror 3 on a surface of a workpiece W for executing heat-treatment on the surface. In this case, the focused heat-treating area on the surface is made into an elongated elliptical configuration, so that heat energy of the laser beam imparted to the surface of the workpiece becomes high at the central portion 4a of the elliptical heat-treating area 4 and low at both ends 4b and 4c thereof. More specifically, when a surface heat-treatment is performed, it is required that the focused heat-treating area is provided with predetermined amounts of length and width, and hence the focus of the optical system in the conventional apparatus has to be adjusted, i.e. shifted, so that the heat-treating area 4 has substantially the elliptical configuration, wherein the heat energy of laser beam is made high in the central portion and low in the end portions of the ellipse. Such a distribution of heat energy, however, has entailed uneven depth Ho in the surface heat-treatment of the workpiece W.

SUMMARY OF THE INVENTION

An object of this invention is to provide a surface heat treating apparatus wherein the aforementioned drawbacks of the conventional heat treating apparatus can be substantially eliminated.

Another object of this invention is to provide a surface heat treating apparatus including a composite cylindrical segment mirror for obtaining an elongated surface portion to be heat-treated in accordance with the focused configuration on the focus position of the workpiece thereby to perform the surface heat treatment with equally heated depth of the workpiece.

According to this invention, these and other objects can be achieved by providing a surface heat treating apparatus in which an emitted laser beam is reflected and focused into a heat-treating area formed on a surface of a workpiece and the apparatus is characterized by comprising a composite cylindrical segment mirror made of two convex-cylindrical segment mirrors joined together so as to have a V-shaped configuration and a concave cylindrical mirror located on a path of a laser beam reflected by the composite cylindrical segment mirror for focusing the laser beam on the surface of the workpiece.

The positional relation between the composite cylindrical segment mirror and the cylindrical mirror of the apparatus and the workpiece may be so selected that the heat-treating area formed on the surface of the workpiece is of an elongated rectangular configuration having constant width and depth.

Furthermore, the two convex-cylindrical segment mirrors may be joined together with a predetermined angle α formed therebetween so that the composite cylindrical segment mirror of V-shape is provided, and the angle α may be determined such that the laser beam reflected by the two convex-cylindrical segment mirrors is transmitted to the cylindrical mirror in a manner reversed with respect to the lengthwise and widthwise directions of the composite cylindrical segment mirror, and a heat-treating area of a rectangular configuration is thereby obtained on the surface of the workpiece.

BRIEF DESCRIPTION OF THE DRAWINGS

In the accompanying drawings:

FIG. 1 is a diagram showing a conventional surface heat-treating apparatus; and

FIG. 2 is a diagram showing a surface heat-treating apparatus constituting a preferred embodiment of this invention.

DESCRIPTION OF THE PREFERRED EMBODIMENT

A preferred embodiment of a surface heat-treating apparatus according to this invention will now be described with reference to FIG. 2 wherein like reference numerals as those used in FIG. 1 are designated by the same reference numerals.

In the embodiment shown in FIG. 2, there is provided a composite cylindrical segment mirror 5 which is obtained by combining a pair of cylindrical segment mirrors in a V-shaped longitudinal configuration. A laser oscillator of a known type, not shown, is located so that a laser beam therefrom is projected to a joined portion 5a of the composite segment mirror 5. Upwardly of the mirror 5 is provided a concave cylindrical mirror 3 which reflects the laser beam reflected by the mirror 5 toward a workpiece W. The laser beam 1 thus reflected is focused to form a heat-treating area 6 of an elongated rectangular configuration of a constant width and a constant heat-treating depth H on a surface of the workpiece W. Differing from the heat-treating area 4 of the conventional apparatus, which has been formed into an elongated elliptical configuration, heat energy in this embodiment shown in FIG. 2 is distributed evenly throughout the heat-treating area 6 of the elongated rectangular configuration inclusive of the central portion 6a and the end portions 6b and 6c.

The formation of the heat treating area 6 treating a constant depth H on the surface of the workpiece W is attained by the optical system of this invention which comprises the composite cylindrical segment mirror 5 and the cylindrical mirror 3. Particularly, the composite cylindrical segment mirror 5 is made of a pair of convex cylindrical segment mirrors, each formed with a number of segment mirrors 5b extending lengthwisely on the concave surface. The pair of convex cylindrical segment mirrors are then joined together along a surface 5a to be joined so as to exhibit a V-shaped configuration having an angle α between the two convex mirrors.

The cylindrical segment mirror 5 may be produced by use of an angle-adjusting device such as a goniostage in such a manner that a blank is placed on the stage of the angle-adjusting device and the surface of the blank is cut, while the angle of the stage is adjusted as desired, by means of a diamond cutter into a desired mirror configuration. Thereafter, the surface 5a is formed so that the pair of component mirrors are joined together along the surface 5a at an angle α.

The operation of the heat-treating apparatus according to this invention will be described hereunder.

When laser beam emitted from a laser oscillator is projected in an area nearby the joined portion 5a of the cylindrical segment mirror 5, the projected laser beam is reflected by the mirror 5 in a manner divided into a number of rectangular shaped fractions of beam. The beam fractions thus reflected from the mirror 5 are transmitted to the cylindrical mirror 3 in a manner reversed with respect to the lengthwise and widthwise directions of the cylindrical segment mirror 5. The laser beam reflected from the cylindrical mirror 3 is thus focused into the elongated rectangular shaped area constituting the heat-treating area 6 of the surface heat-treating apparatus of this invention.

The width of the heat-treating area 6 may be determined as desired on the basis of the width of the segment mirrors 5b of the cylindrical segment mirror 5, and furthermore, since the two component mirrors of the composite cylindrical segment mirror 5 are joined together in a V-shaped configuration forming an angle α therebetween, the path-length of the laser beam can be thereby adjusted and the heat-treating area 6 causing heat-treatment of a constant depth H in the central portion as well as the end portions 6a and 6b can be thereby realized.

It will also be easily understood that the width and the depth H of the heat-treating area 6 can be adjusted freely by varying the width of the segment mirrors 5b and the tapered angle α between the two component cylindrical segment mirrors.

What is claimed is:

1. A surface heat-treating apparatus in which an emitted laser beam is reflected and focused into a heat-treating area formed on a surface of a workpiece, comprising:
   a composite cylindrical segment mirror made of two convex-cylindrical segment mirrors joined together so as to have a V-shaped configuration; and
   a concave cylindrical mirror located on a path of a laser beam reflected by said composite cylindrical segment mirror fopr focusing the laser beam on the surface of the workpiece.

2. The surface heat-treating apparatus according to claim 1 wherein the convex surface of said composite cylindrical mirror faces the concave surface of said convex cylindrical mirror which faces to the surface of the workpiece to be heat-treated so that the heat-treating area formed on the surface of the workpiece is made into an elongated rectangular configuration permitting heat-treatment of a constant depth.

3. The surface heat-treating apparatus according to claim 1 wherein said two convex-cylindrical segment mirrors are joined together with a predetermined angle in a V-shaped manner so that the laser beam reflected by the two convex-cylindrical segment mirrors is transmitted to the cylindrical mirror in a manner reversed with respect to the lengthwise and widthwise directions of said composite cylindrical segment mirror and said heat-treating area is thereby formed into an elongated rectangular configuration permitting heat-treatment of a constant depth.

* * * * *